United States Patent Office 3,421,902
Patented Jan. 14, 1969

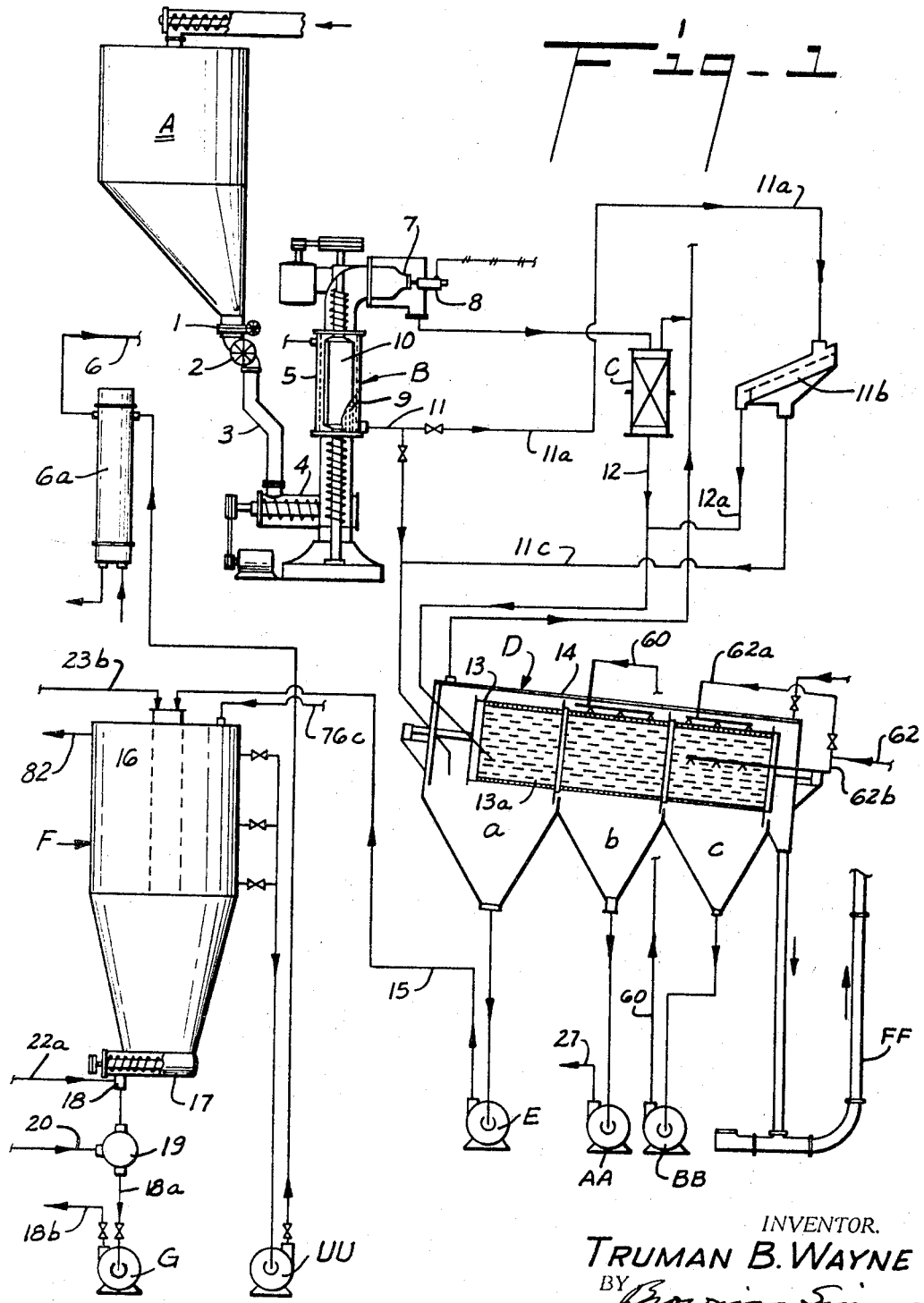

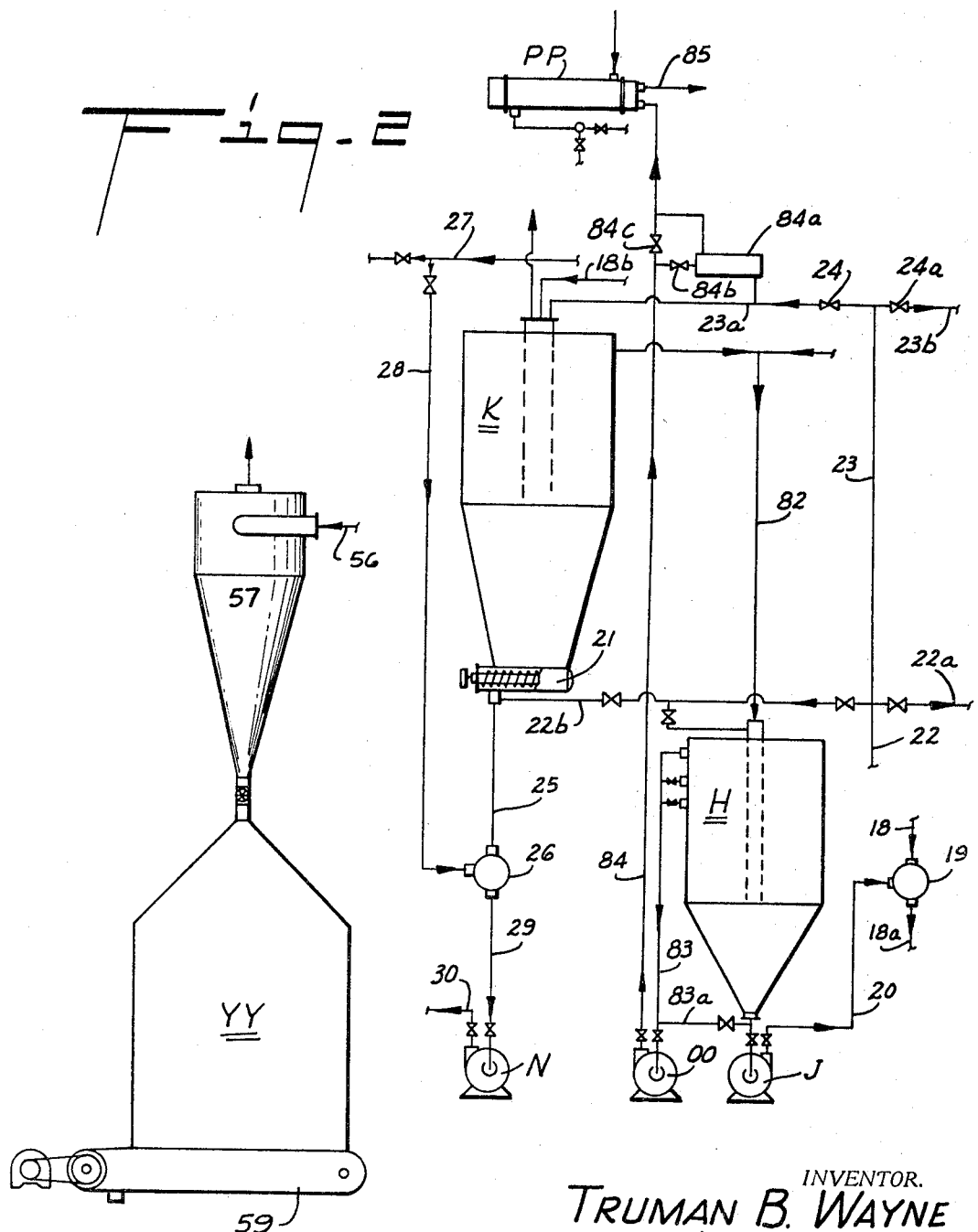

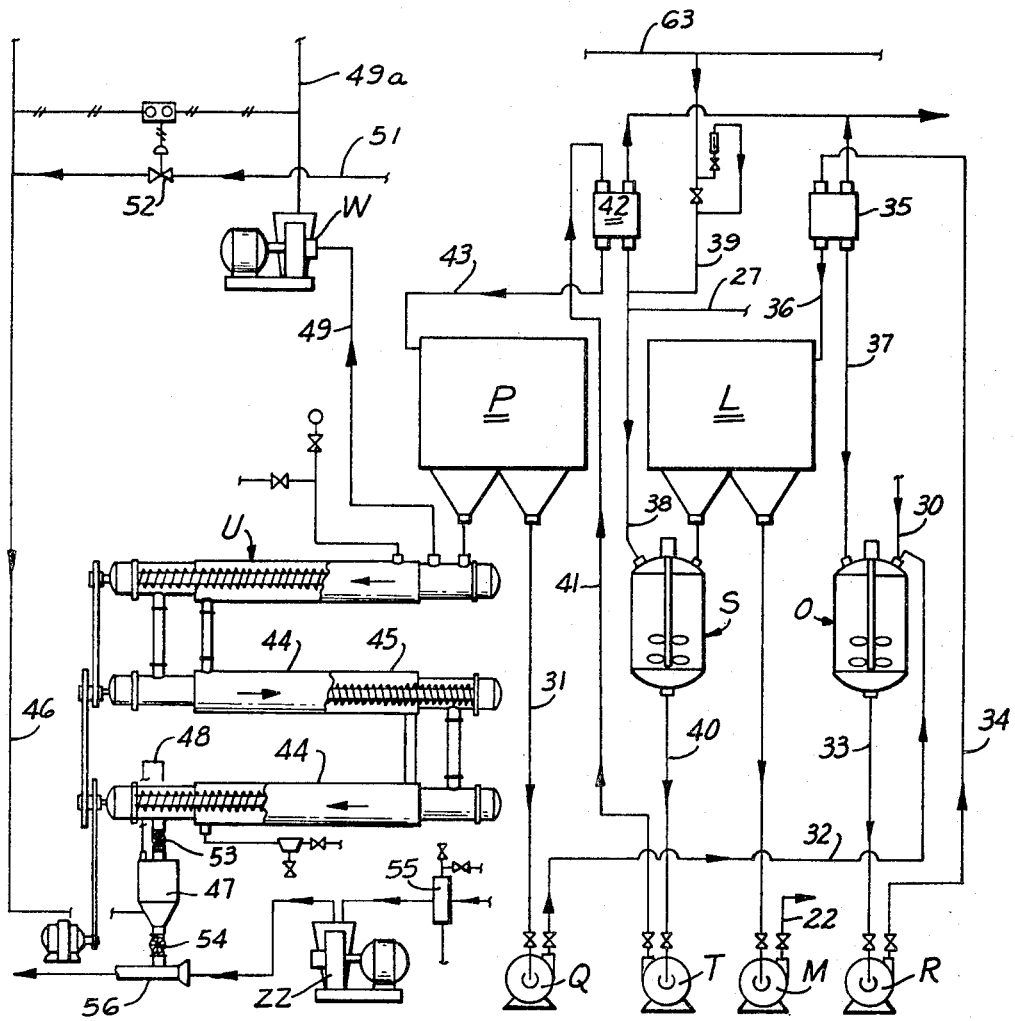

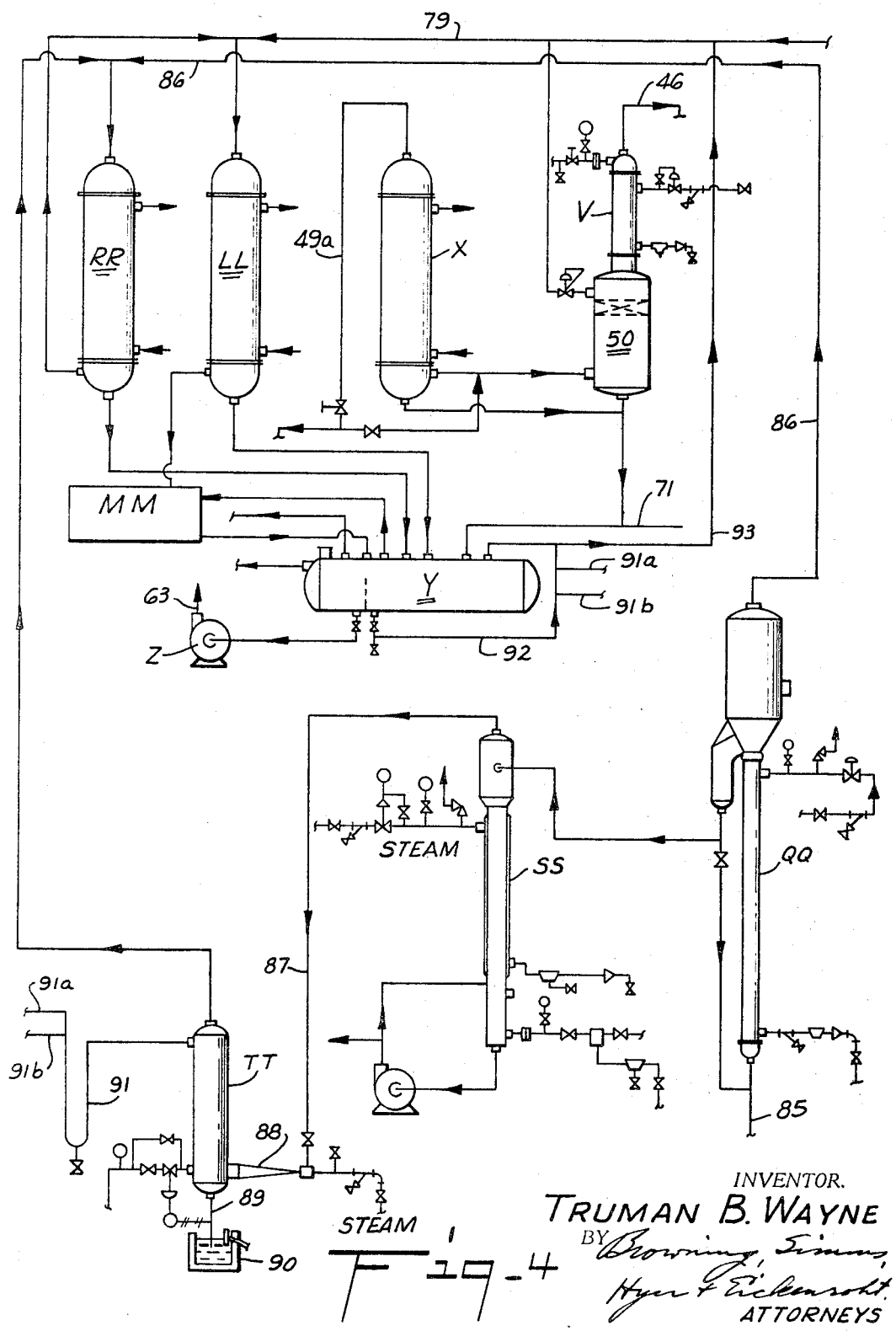

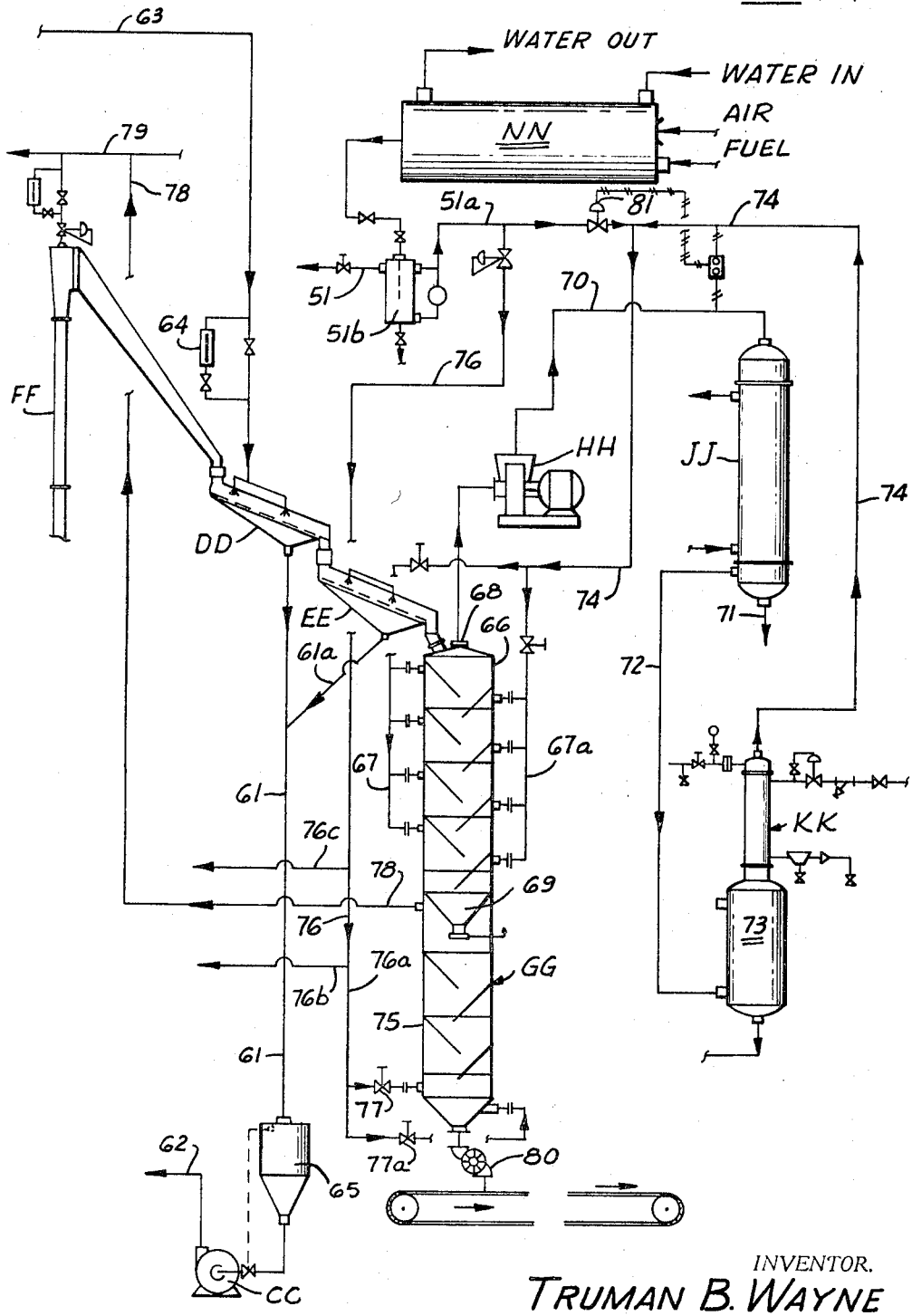

3,421,902
RICE MILLING PROCESS
Truman B. Wayne, P.O. Box 13086,
Houston, Tex. 77019
Continuation-in-part of applications Ser. No. 308,560,
Sept. 12, 1963, Ser. No. 408,702, Nov. 3, 1964, and
Ser. No. 107,505, May 4, 1961. This application
Feb. 24, 1966, Ser. No. 529,814
U.S. Cl. 99—80                                11 Claims
Int. Cl. A23l 1/10; B02 5/02

The present invention relates to improvements in extractive milling processes for rice and is a continuation-in-part of my copending application Ser. No. 308,560, filed Sept. 12, 1963 now abandoned, which in turn is a continuation-in-part of my prior applications Ser. No. 43,351 filed July 18, 1960, and Ser. No. 81,969 filed Jan. 11, 1961, both abandoned, which were copending therewith; and is a continuation-in-part of my copending application Ser. No. 408,702 filed Nov. 3, 1964, now U.S. Patent No. 3,261,690, which in turn is a continuation-in-part of said application Ser No. 308,115, filed Sept. 11, 1963 now abandoned and of my prior application Ser. No. 301,492 filed Aug. 12, 1963, now U.S. Patent No. 3,217,769, both of which were copending therewith, and of my prior application Ser. No. 107,505 filed May 4, 1961, now abandoned which was copending with said Ser. No. 301,492. My copending application 308,560 mentioned above describes a new process for softening the bran layers on brown rice, which previously has been shelled and cleaned as in conventional milling processes, by mixing a liquid bran softening agent therewith, followed by removal of the softened bran layers to any desired degree in the presence of the liquid bran softening agent under conditions far less severe in impact, mechanical and thermal stresses and abrasion effects than are necessary when using a conventional dry milling process. Removal of the softened bran layers may be by a process otherwise substantially identical with conventional dry milling, or may be by an extractive milling process, similar to a process described in the copending application Ser. No. 408,702.

The latter application discloses a process for milling bran from brown rice in the presence of a solvent effective to extract fatty components from the rice, bran and germ. In the simultaneous milling and extraction step the solvent performs five functions:

(a) Extraction and removal of fats and coloring matters from bran and germ;

(b) Maintaining the bran in a wet and increasingly softened condition on the rice kernels;

(c) As a liquid medium for flushing comminuted bran particles from the grain;

(d) Flushing openings, such as openings in the screen of a mill, free from bran particles and so increases the efficiency of milling;

(e) Cooling the rice during the milling process and effectively preventing heat checking of the rice and thus substantially reducing breakage of the kernels, and permits effective milling under mild conditions which reduce stresses on the rice with further reduction of breakage.

The solvent also exterminates any insects which may be present and sterilizes any insect eggs which may have been laid into the brown rice grains. Both rice and bran from this process are substantially sterile with respect to insect infestation. The bran component which is milled from the brown rice is produced in lower yield than by the conventional dry milling processes, and its chemical composition conforms more closely to that of the bran layer, per se, because less removal of the starchy endosperm has occurred.

It is an object of the present invention to provide an improved extractive milling process wherein separate milled rice and bran fractions move at a faster rate through process steps following a milling step than in previous processes.

Another object is to provide an improved extractive milling process wherein addition of lesser quantities of fresh solvent to the system is required than in prior extractive milling processes.

Another object is to provide such process wherein the total quantity of miscella distilled to provide fresh solvent is smaller than in prior processes.

It is another object to provide an improved extractive milling process for rice in which breakage of kernels of the rice in operations following the extractive milling step is reduced.

Another object is to provide such a process in which the kernels are freed from traces of adhering bran and polish prior to desolventizing.

Another object is to provide such a process wherein rice kernels are freed from a major proportion of bran during during the milling step, and successive washing operations are conducted countercurrent to the flow of solvent, principally by a descending or cascading gravity type flow of grain, wherein the milled rice is further extracted and washed free from bran and polish.

Another object is to provide an improved extractive milling process wherein the necessity for closed system vacuum filtration for the recovery of partially extracted bran and polish solids and for washing filter cakes on a filter is eliminated.

Another object is to provide an improved extractive milling process wherein difficulties in the vapor handling and recovery systems are eliminated by feeding clean kernels of rice substantially free of loose polish to the desolventizing operation.

Still another object is to provide an improved desolventizing procedure in an extractive milling process which minimizes chalking and development of fissures in kernels of the rice and removes residual solvent with sufficient completeness to meet Food and Drug Administration requirements.

Another object is to provide an improved extractive milling process wherein hazards due to vapor and dust explosions are minimized.

Other objects and advantages will become apparent to those skilled in the art from the following description and the attached drawings.

The present invention is an improvement on the extractive milling processes shown in the copending applications mentioned above. This invention may be generally stated as comprising milling brown rice in a sequence of processing steps which include wetting brown rice with recycled full miscella; milling softened bran from the rice with the rice grains in intimate rubbing contact with each other and with pressure upon each other; during the milling step passing a stream of full miscella in contact with the rice and bran thereby extracting a substantial proportion of oil from the rice and bran, controlling the rate of flow of miscella through the rice during the milling step to flush a major proportion of the removed bran, preferably 80% or more, from the rice kernels, separately withdrawing a bran-miscella slurry and a rice kernel effluent containing relatively little bran from the milling step, passing the rice kernels and bran separately through multi-stage washing and extraction steps, and separately desolventizing the resulting clean rice substantially free from loose bran and rice polish, and the resulting extracted bran.

The term "full miscella" is used in this specification and claims to mean a volatile solvent effective to extract fatty components from rice and bran which contains at least 6%, and preferably about 6% to 12% of rice oil.

A full miscella, defined above, containing rice oil in the stated proportions will penetrate the bran layers on brown rice in a very short time sufficiently to soften the bran to a degree such that it is easily removable in a milling step. The rapid action of full miscella is in contrast to the slow action of solvent alone, which penetrates the bran layers so slowly that softening action is not obtained in any reasonable time. A short contact time, as for example, the time required to pass through an inlet section in a mill, usually not more than from 20 seconds to a minute or so, minimizes penetration of miscella into the endosperm which would subsequently necessitate a longer extraction time to remove oil from the kernels. It is further preferred that in the washing and extraction steps applied to the rice fraction after withdrawal from the milling step the flow of rice be countercurrent to the direction of flow of solvent through the washing and extraction steps and be carried out by passing solvent through an at least slightly expanded bed of rice, preferably in a vapor tight rotary washer and/or on vibrating screens to extract residual fatty substances from the kernels and to substantially completely remove residual bran and fine polish particles from the surfaces of the kernels. Fresh solvent enters into a final washing and extraction stage and moves countercurrently to the flow of rice in a plural number of stages before being discharged as a weak miscella to a first bran extraction step. It is further preferred that the recovery of bran solids from recirculated miscella be by settling, washing and centrifuging to eliminate the disadvantages inherent in closed system vacuum filtration, and washing of the bran as filter cake on a filter.

An improved desolventizing procedure for the clean rice is contemplated which effects substantial savings in equipment costs, and produces a desolventized clean rice of improved appearance and free from residual solvent. The present process also avoids problems in processing due to a large quantity of fine bran and polish residues remaining on the finished rice.

In the present invention it is preferred that a full miscella be maintained by a short recirculation cycle through a mill and a primary miscella settler and be controlled by controlling the quantity of full miscella withdrawn to other process steps and replaced by a more dilute miscella entering the primary miscella settler. Using a recycle step of this type it is possible on starting up to quickly build up the required amount of rice oil in the miscella supplied to presoftening and milling steps, and it is possible to pass a full miscella to oil recovery steps while maintaining a full miscella of selected strength for circulation to the wetting and milling steps.

Preferably the last washing of the rice fraction is conducted with fresh solvent on a vibrating screen so that any residual particles of bran and polish are completely removed from the rice which is again shaken on a vibrating screen to free it of adhering solvent before introduction of the rice into a desolventizer. Elimination of bran and polish particles from the rice fraction prior to introducing the rice into a desolventizing step eliminates difficulties due to accumulation of these materials in recovery steps subsequent to desolventizing, wherein the solvent is recovered from the recirculated gas stream.

The desolventizing step preferably is conducted by passing the rice downward in a semi-fluidized bed exposed to warm inert gas, preferably combustion gases, for vaporizing solvent from the rice. Preferably warm inert gas containing solvent vapor from the desolventizer passes through a recycling system in which the gas is cooled, evaporated solvent contained therein is condensed and separated from the gas, and the gas is reheated and returned to the desolventizer. Such recycle of desolventizer gas prevents build-up of solvent vapor in the desolventizing gas to an explosive level, and assists in a very high rate of recovery of solvent from the used gas.

For some reason, at present unknown, a mixture of gases resulting from substantially perfect combustion of a hydrocarbon material, such as natural gas in air and containing as its principal components nitrogen, carbon dioxide and water vapor, decreases chalking of the rice during desolventizing and gives the rice a better appearance. Breakage of rice grains also is reduced by the downward cascading flow of the rice. It is believed, however, that this effect is due to the prevention of water loss from the outer layers of the milled kernel by the moisture content of the inert gas mixture.

A bran-miscella slurry is withdrawn from the milling step and its bran content is repeatedly settled, repulped and centrifuged in a series of extraction steps. The bran passes through these steps in direction countercurrent to weak miscella generated by complete washing and extraction of the rice fraction in the steps outlined above. There is no co-mingling of miscellas from rice and bran extraction steps until the solvent has passed through all rice washing and extraction steps. This series of operations requires less fresh solvent than when miscellas are co-mingled before all rice washing and extraction steps are completed and a lesser quantity of full miscella need be distilled to furnish the required amount of solvent.

The centrifuging and repulping steps in bran extraction gives greater rate of throughput and eliminate the disadvantages inherent in vacuum filtration of bran followed by washing the bran cake on a filter.

The attached drawings illustrate diagrammatically one preferred arrangement of apparatus in which the process of the present invention may be carried out.

In the drawings:

FIG. 1 illustrates apparatus for milling brown rice and the preliminary washing steps for separated rice, and a primary miscella settler in the particular system illustrated in all figures;

FIG. 2 is an extension of the system shown in FIG. 1 to the left and below FIG. 1;

FIG. 3 illustrates an extension of the system partially shown in FIGS. 1 and 2 to the left of FIG. 2;

FIG. 4 illustrates an extension of the system shown in preceding figures above FIG. 3; and FIG. 5 illustrates an extension of the same system to the right and below FIG. 1.

FIGS. 1-5 taken together thus show a flow diagram illustrating a sequence of processing steps of one embodiment of the invention, together with indicated ancillary solvent, oil and solvent vapor recovery systems which are necessary to the design of a fully rounded process but which are not a part of the present invention.

In the particular system illustrated, brown rice from rough or paddy rice shelling and cleaning operations (not shown) is conveyed by a suitable screw, flight, belt or pneumatic conveyor, or delivered by gravity into the brown rice bin A (FIG. 1), and is withdrawn through a suitable bin gate 1 and rotary vapor lock feeder 2 into chute 3 which delivers the brown rice to the feeder section of solvent extractive milling machine B. The latter may be of any suitable vapor-tight extractive milling design as for example one of the types described in my copending applications, Ser. No. 404,315, filed Oct. 16, 1964, now U.S. Patent No. 3,382,904, or Ser. No. 467,427, filed June 28, 1965.

The mill shown in FIG. 1 comprises a horizontal feeder 4, a horizontal or vertical milling chamber 5 wherein the miscella-wetted rice is subjected to a milling action in the presence of sufficient full miscella introduced through pipe 6 to provide the desired cooling and flushing actions on the rice and milling by-products, respectively. Discharge of the milled rice from the apparatus is controlled by the application of a regulated pressure on the discharge gate 7 by means of air or hydraulically operated cylinder 8. The recycled miscella which is heated or cooled as required, by heat exchanger 6a and introduced through pipe 6 freely circulates through the perforations of the milling screen 9 located within the chamber which surrounds the milling rotor 10, and escapes mainly through miscella-bran slurry drain pipe 11, but partially also with the rice through discharge gate 7. Circulation is provided by pump UU.

The miscella-bran slurry discharges directly through pipe 11 into the hopper section *a* of rotary drainer-extractor D. There will be a corresponding drain pipe 11 from each milling machine when more than one milling machine is used, as usually will be the case, which enters a common manifold at pipe 11c which enters hopper *a* of apparatus D. The milled rice and its residual milling by-products and solvent are discharged from the extractive milling machines when more than one milling machine is used, into vapor-tight, horizontal flight conveyor C which conveys the products to its discharge chute 12 which feeds the upper end of the inclined rotary screen 13 which operates within the vapor-tight housing 14 of the rotary drainer and extractor D.

Alternatively, the miscella slurry containing a major proportion of bran removed from kernels of the rice during the milling step may be passed through line 11a to vapor-tight vibratory screen 11b, which is equipped with a perforate or mesh screen which will pass the miscella and fine particles, inclusive of bran, but retain and allow the recovery of broken rice which has commercial value as brewer's rice or the larger broken grades of rice. The miscella-bran slurry is then returned to drain pipe 11 through line 11c, and broken rice screened out is returned to chute 12 by chute 12a.

The rotary screen 13 may be fitted with lifter flights which lift and cascade the rice to promote free drainage into hopper *a* of the miscella and bran slurry through its oval or rectangular perforations or screen mesh openings 13a. The miscella-bran slurry is then transported by means of slurry pump E through pipe 15 into the downcomer 16 of primary miscella settler F where the bran solids are settled in the specially shaped tank to a sludge concentration of approximately 35 percent solids. The sludge density may be varied within wide limits of from 20 percent to 55 percent solids, this depending on the available settling time, but the material may be successfully discharged at the higher density by means of discharge screw conveyor 17 or an equivalent bottom rake, into pipe 18 of suitable diameter to allow flow to line mixer 19 where the sludge is diluted with setlings from the evaporator feed tank (miscella clarifier) H, (FIG. 2), and pump J through pipe 20. It is then delivered to pump G (FIG. 1) through pipe 18a and is pumped to resettler K (FIG. 2) through pipe 18b.

The bran slurry which settles in slurry resettler K is withdrawn by discharge screw conveyor 21, or an equivalent bottom rake, into pipe 25 which enters line mixer 26 where the heavy sludge is diluted with weak miscella from the second stage rice extraction which is received from pump AA (FIG. 1) through pipes 27 and 28. The diluted slurry from the line mixer 26 then is delivered through pipe 29 to pump N from which it is pumped through pipe 30 into slurry mixer O (FIG. 3) where it is thoroughly mixed and further diluted with the filtrate from centrifuge P which is received through pipe 31 by pump Q and delivered through pipe 32.

The sludge in either primary settler F or resettler K may also be diluted in the discharge nozzles of their respective discharge screws 17 and 21 with the filtrate from centrifuge L which is pumped into pipes 22, 22a and 22b by pump M, or this filtrate may be discharged by means of the same pump M into either primary miscella settler F or slurry resettler K by means of pipe 23 and its branches 23a and 23b by properly settling valves 24 and 24a.

The diluted and thoroughly mixed slurry from slurry mixer O is then delivered through pipe 33 to pump R which pumps it to centrifuge L through pipe 34, feed regulator 35 and pipe 36. The excess supply to feed regulator 35 is returned to slurry mixer O by means of pipe 37. The slurry is centrifuged in centrifuge L, the filtrate going to primary miscella settler F and/or to slurry resettler K as previously described, and the bran cake is dropped into slurry mixer S where it is repulped with filtrate from pump AA (FIG. 1) received through pipe 27 and also some freshly distilled solvent from pipe 39 and delivered through pipe 38. The repulped slurry is then delivered through pipe 40 to pump T which pumps it to centrifuge P by means of pipe 41, feed regulator 42 and pipe 43. The excess of slurry is returned to mixer S by means of pipe 38.

The filtrate from centrifuge P, as previously described, is pumped to slurry mixer O. The bran cake is discharged directly into bran desolventizer U which comprises two or more steam-jacketed cylindrical sections 44 in each of which a cut-flight screw conveyor 45 receives the bran cake at the head end of each section and discharges it at the opposite end into the succeeding cylindrical section. Steam or a hot liquid is circulated in the jackets of the two or more cylindrical sections to heat the bran meal which quickly forms from the bran cake received into the first section, and causes evaporation of the solvent.

The bran meal is also treated in countercurrent manner with superheated inert gas, or a mixture of superheated inert gas and sholvent vapor, which has been heated to an elevated temperature, usually with the range of 270°–330° F., in recycle gas heater V (FIG. 4) and delivered through duct 46 into bran holder 47 and is circulated through the dried bran meal and escapes through duct 48 into the lower cylindrical section of bran desolventizer U and continues countercurrently upward through the upper dryer sections and escapes through duct 49 from which it is drawn into recycle gas blower W and is delivered by means of duct 49a to recycle gas condenser X (FIG. 4) wherein the evaporated solvent vapor is condensed and removed as liquid solvent in the knockout drum section 50 of recycle gas heater V, and is collected in solvent separator Y where the solvent is settled from its water content and is returned to the extraction plant by means of solvent pump Z and pipe 63.

The residual gas which comprises a mixture of inert gas and solvent vapor is then reheated to a temperature of 270°–330° F. and is recycled through duct 46 to the bran holder 47, and the cycle is repeated. Any decrease in pressure within the recycle gas system due to gas losses or condensation of solvent vapors by condenser X is regained by supplying inert gas from duct 51 (FIG. 5) through differential pressure control valve 52 (FIG. 3) which maintains a constant differential pressure within the range of 5″ to 10″ W.P. between ducts 46 and 49a, with the pressure always higher in duct 49a.

The fully desolventized, deodorized rice bran is discharged from bran desolventizer U through vapor lock 53 into bran holder 47 and is then recovered through a second vapor lock 54 by the bran cooling and transporting system which comprises bran cooling blower ZZ, air drying heater 55 which heats the air above its dewpoint, blow-pipe 56, cyclone collector 57 (FIG. 2) and bran bin YY which is equipped with a suitable live bottom conveyor arrangement 59 for the removal of bran from the bin. The desolventized bran may be screened to remove small broken rice particles prior to sacking and bulk shipments. The storage and subsequent handling of the bran are conventional and do not comprise part of this invention.

The milled rice from chute 12, consisting of whole and broken kernels which are larger than the finely broken rice, and its adherent bran and polish particles which will wash through the oblong or rectangular perforations in the metal or wire screen of the revolving cage within rotary drainer and extractor D (FIG. 1) are cascaded within the upper section to allow drainage of the miscella-bran slurry into compartment *a* of the miscella collection tank, as was previously described. The milled rice then proceeds to the middle section *b* where it is washed by spraying with weak miscella which is pumped through pipe 60 by third extraction stage miscella pump BB which takes suction from the third compartment *c* of the miscella collection tank of apparatus D. The effluent washings, now a weak miscella, are pumped by pump AA through line 27 to the bran extraction equipment as previously described. Finally, the milled rice enters the third or last section of apparatus D where it is washed with the dilute washings received from vibratory washer DD and vibratory desolventizer EE (FIG. 5) by drain pipe 61, surge tank 65 and pump CC which delivers the dilute washings through pipe 62, 62a and 62b (FIG. 1) to spray nozzles which spray the rice in the third section. The latter drains into compartment c of the miscella collection tank.

The washed rice, which still contains small amounts of dilute, oil-containing solvent and some polish fines, is elevated to vibratory washer DD by means of elevator FF where it is successively washed with pure solvent obtained from solvent pipe 63 (FIG. 5). The solvent is preferably metered through rotameter 64 and is forced through the two spray headers at the termini of solvent pipe 63. The washings drain through pipe 61 to surge tank 65 which supplies pump CC. The washed rice, now substantially free of oil-containing solvent and polish fines but still wet with fresh rinse solvent, passes to vibratory desolventizer EE where most of the remaining surface and interstitial solvent is shaken off and drains through pipe 61a to pipe 61 and thence to surge tank 65.

The cleanly milled rice, which still contains some absorbed and surface solvent, is then discharged to rice desolventizer GG (FIG. 5) which comprises a vertical column having an upper section 66 with internal staggered baffles, oppositely placed recycle gas manifolds 67 and 67a, an exhaust stack 68 and a hoppered bottom 69 which is equipped with a slide gate. The column is filled and recycle gas blower HH is started to establish desolventizing gas circulation into this blower from recycle gas stack 68 into exhaust duct 70 and thence into recycle gas condenser JJ where all or any desired part of the solvent in the recycle gas may be condensed and drained to pipe 71 which delivers to solvent separator Y (FIG. 4). The remaining gas, now saturated with respect to the solvent vapor and moisture, passes through duct 72 to the knockout section 73 of recycle gas heater KK and thence into the tubular heater section where it is superheated to a temperature sufficient to have evaporative ability when recycled to upper section 66 of the rice desolventizer through duct 74 which supplies the recycle gas manifolds 67 and 67a. To prevent cracking of the rice, the entering gas temperature is preferably within the range of 120°–150° F. The solvent-saturated gas leaving the desolventizer to be recycled usually is at a temperature of 95°–120° F.

When the rice in upper section 66 is sufficiently desolventized, the slide gate in hopper bottom 69 is opened and circulation into lower deodorizer section 75 of the apparatus is established. As desolventized rice enters section 75, additional solvent-wet rice enters the upper section 66. When both column sections are full, inert gas is admitted from pipe 76a through flow control valves 77 and 77a. The inert gas is forced upwards through the rice to remove the last traces of solvent, and is exhausted through stack 78 into main vent header 79 which collects solvent vapors from the high point of all apparatus in which they occur. The main vent header terminates to vent condenser LL (FIG. 4) which condenses most of the solvent vapors and delivers the liquid solvent to solvent separator Y. Any uncondensed solvent vapors are sent from the vent condenser to the solvent vapor recovery system MM which may be of any conventional type. Its condensate is returned to solvent separator Y.

The desolventized, deodorized milled rice product is then delivered through rotary vapor lock 80 (FIG. 5) to a suitable conveyor and thence to the finishing house where it is graded, coated and polished if desired and sent to storage or packing. These latter operations are conventional practices not within the scope of this invention.

Inert gas generator NN comprises a conventional apparatus for the exact combustion of a fuel, preferably natural gas, so that the combustion products are primarily nitrogen, carbon dioxide, water vapor and traces of oxygen, unburned hydrocarbons and carbon monoxide which are delivered at a pressure of from 5 to 10 p.s.i. The main inert gas ducts 51 and 51a originate from water knockout pot 51b, and through several branches supply both the bran desolventizer U and the rice desolventizer and deodorizer GG with a substantially oxygen-free inert atmosphere which will prevent explosions of solvent vapor in all apparatus throughout the process. When drawn from branch inert gas pipes 76, 76a, 76b and 76c it is preferably under a moderate pressure of 2 to 3 p.s.i. It will, therefore, flow freely through the deodorizer section 75 of apparatus GG and into other apparatus and vessels in which atmospheric pressure or a slight negative pressure exists due to vent connections from them to the main vent header which in turn connects to the vent condenser LL and from thence to the vapor recovery system MM in which there is a final vent. A pressure of 5 to 6 p.s.i. in the main inert gas ducts 51 and 51a is sufficient to deliver inert gas through differential pressure control valves 52 and 81 into the return recycle gas ducts 46 and 74, respectively, to maintain a constant pressure differential between them and the recycle blowers' discharge lines 49a and 70, respectively. Thus, a constant driving force is provided through both desolventizing systems, regardless of the pressure drop through their respective recycle condensing and gas heating apparatus due to condensation of solvent vapor.

Recovery of the extracted rice oil begins with the collection in strong miscella clarifier H of the strong miscella which is derived from the overflow from primary miscella settler F and slurry resettler K through pipe 82. The resettled strong miscella is delivered through pipe 83 to the clarified miscella pump OO from which it is pumped through pipe 84 to the miscella preheater PP where it is preheated to a temperature within the range of 180°–220° F. and passes through pipe 85 to the rising film evaporator QQ (FIG. 4) where solvent vapors are boiled off and pass through vapor pipe 86 to solvent condenser RR where they are condensed and the liquid condensate is sent to solvent separator Y. Uncondensed vapor is directed to the vent header 79. Pipe 84 may deliver directly to miscella preheater PP, but if the miscella is still cloudy when withdrawn from primary miscella settler F by pump OO it is preferably sent through miscella filter 84a by proper manipulation of valves 84b and 84c and returned to pipe 84.

The oil recovered in evaporator QQ still contains from 5 to 20 percent of solvent, this depending on the distillation temperature and the boiling point of the solvent employed, and is sent to oil stripper SS where the remaining solvent is stripped from the oil with live steam at a temperature of about 240° F. The oil is then preferably cooled, filtered to remove suspended bran particles and sent to storage. The solvent and water vapors are drawn off through vapor pipe 87 by means of steam ejector 88 and enter water stripper TT which is maintained at a temperature of 212° F. to boil off the remaining solvent vapor which enters vapor duct 86 and is condensed in solvent condenser RR. The water level in water stripper TT is maintained by barometric leg pipe 89 which is in seal pot 90. Stripper TT also strips solvent from the water drawn from the bottom of solvent separator Y by means of the siphon 91 through its connections 91a and 91b to solvent separator drain pipe 92 and vent pipe 93.

In general, the evaporation of the miscella to recover the oil and solvent, and the steam stripping of the oil to remove and recover the final amount of solvent are conventional operations which are described herein as ancillary or auxiliary to the invention, and because they are made necessary by the invention. However, no claim to novelty for these operations, per se, is made by the applicant.

The brown rice processed by the invention may be of any variety which is classified under the three main divisions according to grain size and shape, i.e., long, medium or short grained varieties.

The solvent may be any suitable commercially available type such as hexane, heptane, trichloroethylene, ethylene dichloride, substantially anhydrous isopropanol, or the like, which are commonly used in solvent extraction processes. Constant boiling azeotropes comprising one or more solvents with small proportions of water are also contemplated. Hexane is the preferred extractive solvent because of its ready availability and low cost, and its ready recovery by evaporation and steam stripping.

It will be seen that in the sequence of processing steps of the present invention a recirculated miscella comprising a volatile solvent containing rice oil within an oil concentration range of 6% to 12%, or higher, the actual concentration depending on the number of times the miscella is again recycled to the extractive milling machines from the primary miscella settler, and the rate at which the miscella is withdrawn to the evaporator for solvent and oil recovery and replaced by medium miscella from bran extraction, provides an improved process for presoftening bran on the brown rice and extractive milling of the rice in that the presoftening time may be shortened to the normal time, usually not more than a minute or so, required for the brown rice to pass through the inlet portion of a milling machine. It is entirely possible to isolate the primary miscella settler and its full miscella recycling system to the extractive milling machines so that no half or weak miscella from subsequent rice extraction stages and/or bran extraction are returned directly to the primary settler. This type of operation is highly advantageous in starting up the milling operation since it results in very fast build-up of oil content in the miscella to the desired level.

The term "half miscella" is used in this specification and claims to mean an oil solvent containing about 3% to 5% of dissolved rice oil.

Weak miscellas are preferably first used in the bran extraction steps until they emerge as half miscella from the first stage centrifuge which may be sent either to the primary miscella settler or to the bran slurry resettler, or divided between the two in order to maintain the desired oil content in the full miscella which is recycled to the extractive milling machines. A substantial but not entire separation occurs between the milled or clean rice and the bran and polish solids which are removed during milling, and the milled or clean rice with its residual adherent bran and polish solids and miscella proceed to subsequent extraction and washing steps before emerging as clean fully extracted rice which is then desolventized. The remainder of the bran and polish solids, which preferably comprises 80% to 90% or more of the total, together with full miscella are collected in the primary miscella settler from which the bran and polish solids are reclaimed as a sludge, resettled to recover more of the full miscella, and are then subjected to two or more additional extraction stages to provide a substantially fat-free bran product which is then desolventized.

The content of fatty substances in brown rice is about 2%. Following the extractive milling of rice, the oil content of the bran and polish solids which are largely in the strong miscella as it discharges from the milling machines, quickly reaches an extraction equilibrium with the fat content of the miscella. The miscella in the settled sludge from the resettler vessel is then diluted to the original recycled full miscella concentration of 6% to 12% or more by the introduction of half miscella from the first stage centrifuging operation. This miscella normally has an oil content of about 3% to 5%.

The lower oil content of the half miscella results from the fact that the oil content of the miscella which enters with the bran and polish solids into the first stage centrifuging step has been further diluted by weak miscella effluents from the final rice extraction stages and the second stage centrifuging of the extracted bran, respectively. Therefore, the half miscella may be used in the primary miscella settler to whatever extent it is required to adjust and control the oil content of the full miscella being recirculated to the extractive milling machines and secondarily being sent to the evaporator for solvent and oil recovery, or it may be used exclusively in the dilution of the bran sludge in the resettler, the settled miscella from which is sent to the evaporator and solids to the first stage bran mixing tank which precedes the first stage centrifuge. Finally the extracted substantially bran-free clean rice is sent to the rice desolventizer; the extracted bran and polish solids are desolventized separately in their respective desolventizers; and the solvent and extracted fat are separated by distillation in a solvent vapor recovery system.

Desolventizing the clean rice may be accomplished in any of several types of apparatus. However, since rice is a special case requiring careful handling to preserve it as whole grains to the greatest possible extent, it is preferred that it be desolventized in a baffled vertical column type desolventizer similar to that illustrated in FIG. 5, wherein the fully washed, solvent wet, clean rice enters at the upper part of the desolventizer and is contacted by a pressurized stream of inert combustion gas, or mixture of an inert gas and solvent and vapor which has been superheated to allow rapid vaporization and removal of the solvent from the rice mass as it moves downward in a slightly expanded bed in a state of incipient fluidization to promote rapid circulation of a desolventizing vapor within the moving bed of rice. The gases from the operation are sent in part or entirely through a recycled gas condenser and thence to a recycled gas heater before being returned as superheated recycled gas to the desolventizer. Since 90% to 95% of the total solids entering as brown rice are received and desolventized in this apparatus, it must be of high capacity to permit fast throughput in which the rice is not subjected to temperatures exceeding 140° F., as temperatures above this value result in heat checking and breakage of the rice.

The total bran and polish solids represent only about 5% to 10% of the weight of brown rice entering the process. Therefore in a plant which processes 25,000 pounds of brown rice per hour, the hourly bran polish production does not necessarily exceed 2,500 pounds on dry basis. The solvent content of the bran and polish solids entering the byproduct solids desolventizer does not exceed about 50% by weight of these solids. While any of several types of desolventizers inclusive of desolventizer-toasters, flash desolventizer systems, and steam jacketed dryers commonly known as Schneckens apparatus, may be used in desolventizing the solids at temperatures up to 330° F., the applicant prefers to use a modified Schneckens apparatus similar to that illustrated at U (FIG. 3) which is equipped with a holding tank at its discharge end to which may be introduced either saturated or superheated gas, with or without added steam, which sweeps countercurrently through the solids and evaporates the solvent with the aid of indirect steam heat provided by a surrounding steam jacket or within hollow flights of the screw flights within the apparatus. The solvent containing inert gas is exhausted from the apparatus by a recycle gas blower and sent wholly or in part to a recycle gas condenser before being sent to the recycle gas heater from which the superheated gas is returned to the bran holding tank, and the cycle is repeated.

The fatty substances comprising about 2% of the weight of the brown rice entering the process, may be recovered from the miscella by evaporation followed by steam stripping to remove solvent. The recovered rice oil is of an excellent grade of crude vegetable oil which may be refined by conventional procedures.

The solvent which leaves the evaporator and steam stripper contains water which is removed in a settler.

The freshly distilled substantially anhydrous solvent is then used in the final extraction rinse of the milled rice and from thence proceeds into the process countercurrent to the flow of rice through all the intermediate extraction stages to and inclusive of the secondary extraction. The weak miscella from the latter stage then proceeds countercurrently through the bran extraction stages where its oil content is increased to the point that it eventually returns to the evaporator steam stripper where the oil is recovered and solvent is freed to resume its cycle in the process. Any solvent losses are made up at this stage when the solvent enters the solvent-water separator.

The amount of strong miscella recycled to the extractive milling machines may be varied from 75% to 200% of the weight of the entering brown rice. Less than 75% may not provide adequate rice cooling and bran separation during the bran removal operation. The more recirculated miscella that is used, the better, up to a practical limit of 200%, above which little additional benefit is derived and handling problems increase. The most advantageous temperature range for the recycled miscella is from 90° to 130° F. Lower temperatures retard the bran coat softening effect; higher temperatures unduly increase miscella penetration into the endosperm where it performs no useful function and requires more time for extraction. Higher temperatures also tend to set up thermal stresses in the rice and to result in increased breakage of the rice kernels.

Extraction of the bran is conducted by first reslurrying the bran sludge derived from the primary miscella settler with any available intermediate miscella, but preferably the settlings from the evaporator feed tank, which may be accomplished in the pump to the resettler or in the resettler itself. Here the miscella in the bran sludge is further diluted with half miscella derived from the first stage bran extraction centrifuge. The settled miscella overflows the resettler and is sent to the evaporator together with any excess of strong miscella which overflows the primary miscella settler. The settlings are sent to the bran mixing tank which supplies the first fraction stage centrifuge where it is diluted with the centrifuged liquid from the second stage centrifuge to a solids content of approximately 35%, although this content may be varied widely if sufficient centrifuge capacity is available.

The cake from the first extraction stage centrifuge is repulped in the second bran mixing tank with fresh solvent or a mixture of fresh solvent and any available dilute, intermediate miscella from a rice extraction stage to a comparable density and is extracted in the second extraction stage centrifuge. The bran cake which now contains a low residual content of fatty substances, normally 0.5% or less, and about 35% of solvent is then sent to the bran desolventizer where it is dried to a residual solvent content of 0.5% or less and a moisture content of 8% to 12%. The bran solids are then sent to a storage bin from whence they may be withdrawn for screening to recover small broken rice particles before the bran solids are sold in bulk or as bagged bran.

While certain conventional types of equipment are named in the foregoing specification, the appended claims, and are illustrated in the drawings, it will be understood that functional equivalents of such equipment are contemplated. For instance, solids and liquids separations may be made by means of settling tanks, centrifuges and filters, although the choice is governed by questions of space and time requirements, the density and/or liquid content of the separated solids cake or slurry and other well known factors such as equipment purchase prices, maintenance costs and the like. Likewise, various types of evaporators, strippers, condensers, pumps, heaters, materials handling equipment, desolventizers, vapor recovery systems, etc., fall within the purview of the applicant's process although the items of equipment, per se, are not part of the invention.

The invention having been described, what is claimed is:

1. An improved process for extractive milling of brown rice comprising wetting brown rice with full miscella; milling bran softened by the full miscella from kernels of the rice with rice grains in intimate rubbing contact and with pressure on each other; during the milling step passing a stream of full miscella through rice undergoing milling thereby extracting additional oil from the rice and bran; controlling the rate of flow of full miscella through the rice in the milling step to flush a major proportion of removed bran from the rice kernels; separately withdrawing a rice kernel fraction containing a minor proportion of removed bran, and a bran-miscella slurry from the milling step; passing the withdrawn bran-miscella slurry to a settling step; recycling settled full miscella to the milling step; separately passing the withdrawn rice fraction through a series of rice washing and extraction steps wherein flow of rice is countercurrent to flow of fresh solvent; desolventizing the resulting washed rice fraction; passing a settled bran fraction from the settling step through a series of bran washing and extraction steps countercurrent to a weak miscella withdrawn from a first step in said series of rice washing and extraction steps; and desolventizing the resulting washed bran fraction.

2. The process of claim 1 wherein a stream of settled full miscella is withdrawn from said settling step and is recycled consecutively through both wetting and milling steps.

3. The process of claim 2 wherein oil content of said settled full miscella is controlled by withdrawing a controlled stream of full miscella from said settling step to a solvent recovery step, and the miscella in the controlled stream withdrawn is replaced by a miscella withdrawn from a last step in the series of bran washing and extraction steps.

4. The process of claim 2 wherein the stream of full miscella recycled to wetting and milling steps is at a temperature in the range from 90° F. to 130° F.

5. The process of claim 1 wherein the stream of full miscella passed through the milling step is controlled to flush at least 80% of removed bran from the rice kernels.

6. The process of claim 1, wherein broken rice grains of sizes as large as brewer's rice and larger are separated from the bran-miscella slurry withdrawn from the milling step prior to passing said slurry to the settling step.

7. The process of claim 1, wherein the rice fraction is simultaneously shaken and rinsed with fresh solvent in a last washing and extraction step.

8. The process of claim 7, wherein excess adhering fresh solvent is shaken from the rice fraction after said last washing and extraction step and prior to desolventizing.

9. The process of claim 1, wherein the settled bran fraction from said settling step is withdrawn, diluted with settlings containing a full miscella and resettled in a second settling step; a second settled bran fraction is withdrawn from the second settling step, diluted with a weaker miscella, and centrifuged to produce a centrifuge cake; the centrifuge cake is mixed with weak miscella from a first rice washing and extraction step and is again centrifuged to produce a second centrifuge cake; and the second centrifuge cake is broken up and desolventized.

10. An improved process for solvent extractive milling of rice comprising milling bran from the kernels of brown rice in an extractive milling apparatus wherein the bran coat of the brown rice is wetted prior to the milling action with a recycled miscella containing an extractive solvent and extracted rice oil; subsequently subjecting the softened bran coat to a milling action in the presence of a flushing and cooling miscella stream to remove the bran coat and to recover the bran thus removed as a slurry in the recycled miscella in a primary settler; removing the bran settlings from the bottom of said settler; transferring the said bran settlings to a resettler to undergo further oil extraction from said bran settlings and to recover a full miscel'a therefrom; diluting the resettlings with a weaker miscella derived from a forward countercurrent extraction step; centrifuging the diluted resettlings to extract the solids therefrom, using the half miscella derived from the centrifuging to control the concentration of oil in the recycle full miscella which is returned to the solvent extractive milling machines; repulping the centrifuge cake with a portion of the weak miscella obtained from the extractive, multistage washing of the milled rice together with sufficient freshly distilled solvent to prepare a slurry for second stage centrifuging; centrifuging the said slurry; discharging the centrifuged bran cake into a bran desolventizer; using the dilute miscella derived from centrifuging in the slurry mixer preceding the first stage centrifuge; desolventizing the bran cake from the second stage centrifuging in a desolventizer apparatus with a superheated non-explosive, incombustible recycle gas mixture comprising a major proportion of an inert gas and an minor proportion of solvent vapor.

11. An improved process for solvent extractive milling of rice comprising milling bran from the kernels of brown rice in an extractive milling apparatus wherein the bran coat of the brown rice is wetted prior to the milling action with a recycled miscella containing an extractive solvent and extracted rice oil; subsequently subjecting the softened bran coat to a milling action in the presence of a flushing and cooling miscella stream to remove the bran coat and recover the bran thus removed as a slurry in a primary settler; transferring said bran settlings to a resettler to undergo further oil extraction from the said bran settlings and to recover a full miscella therefrom; diluting the resettlings with a weaker miscella derived from a forward countercurrent extraction step; centrifuging the diluted resettlings to extract the solids therefrom; using the miscella derived from the centrifuging to control the concentration of oil in the recycle full miscella which is returned to the solvent extractive milling machines; repulping the centrifuge cake with a portion of the weak miscella obtained from the extractive multistage washing of the milled rice; subjecting the separated milled rice to multistage countercurrent extraction and surface rinsing to substantially romove the remaining fatty substances and adhering bran solids in an apparatus adapted to exposing the rice kernal surfaces to the extraction medium; removing the excess of surface solvent and desolventizing the extracted and washed milled rice in a desolventizer apparatus with superheated, non-explosive, incombustible recycle gas mixture comprising a major proportion of an inert gas and a minor proportion of solvent vapor.

References Cited

UNITED STATES PATENTS 2,530,272 11/1950 Thrasher _____ 99—80.1 X
2,829,055 4/1958 Ozai-Durrani _____ 99—80

RAYMOND N. JONES, *Primary Examiner.*

U.S. Cl. X.R.

146—279